Sept. 18, 1928.
M. R. SHERBINO
NONEXPANSIBLE HOSE
Filed Dec. 13, 1923
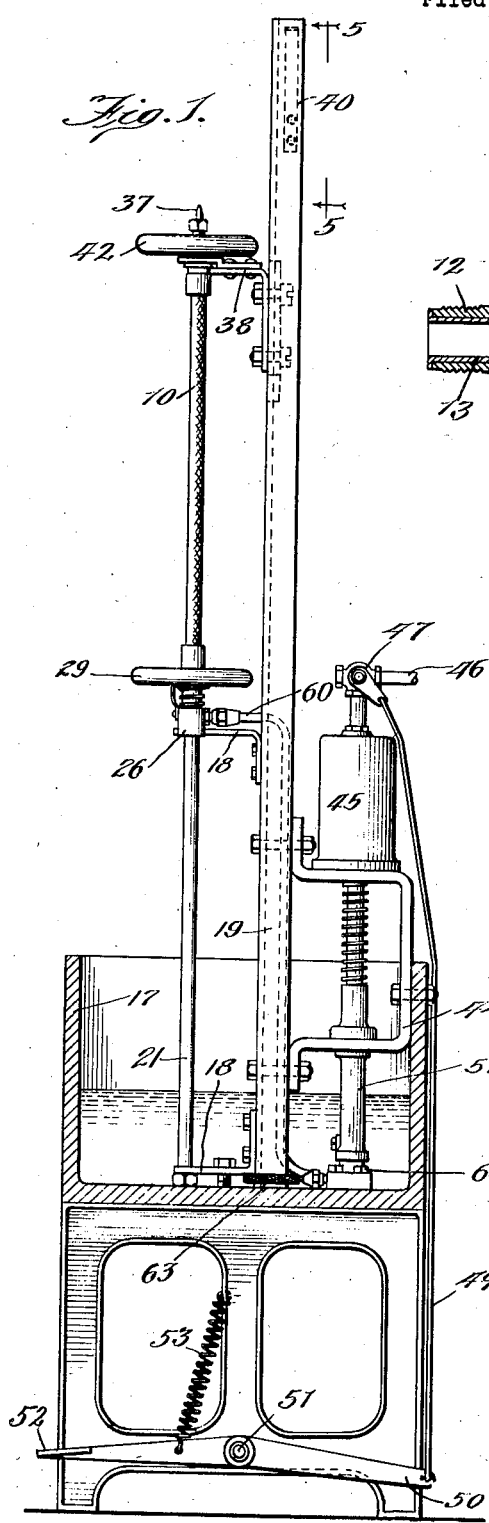
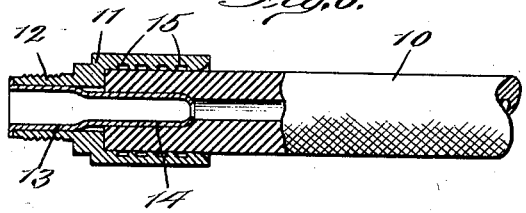
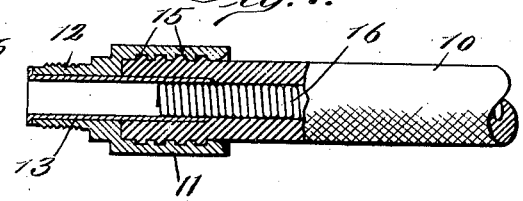
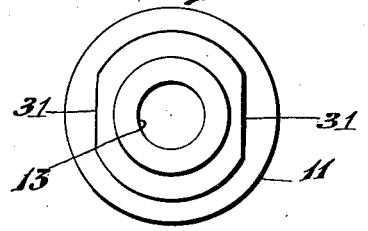
Inventor:
M. R. Sherbino

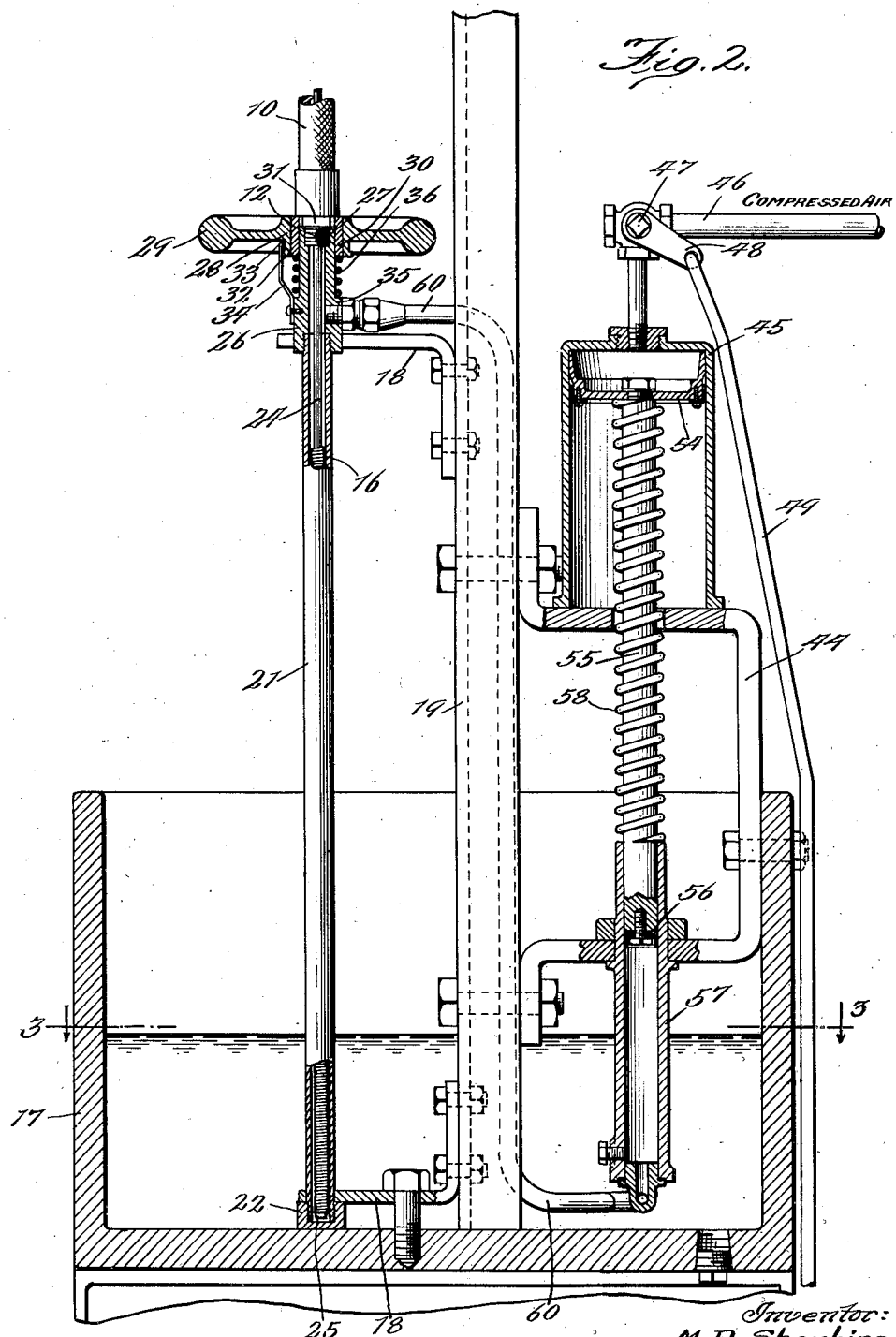

Sept. 18, 1928. 1,684,717
M. R. SHERBINO
NONEXPANSIBLE HOSE
Filed Dec. 13, 1923 3 Sheets-Sheet 3
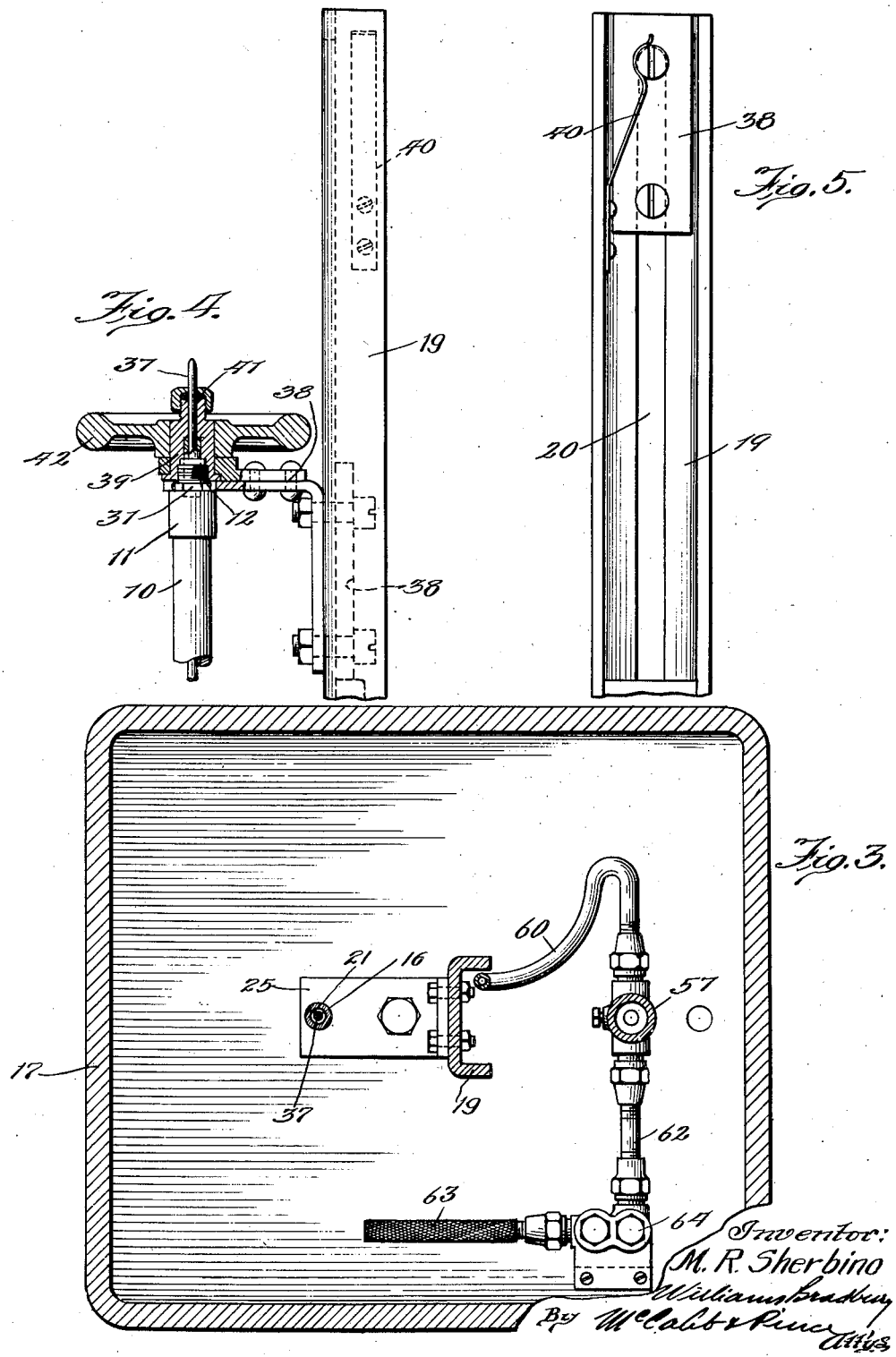

Patented Sept. 18, 1928.

1,684,717

UNITED STATES PATENT OFFICE.

MORTON ROLAND SHERBINO, OF DETROIT, MICHIGAN, ASSIGNOR TO HYDRAULIC BRAKE COMPANY, OF LOS ANGELES, CALIFORNIA, A CORPORATION OF CALIFORNIA.

NONEXPANSIBLE HOSE.

Application filed December 13, 1923. Serial No. 680,294.

This invention relates to non-expansible hose such as are used to convey the fluid to the brake operating cylinders in hydraulic brake systems for automobiles and other vehicles. In patent to Loughead No. 1,461,130, a hose of the character referred to is shown, and also one method of inserting the coil of wire within the hose core.

The present invention has for its object the provision of an improved means for inserting the coil of wire within the bore of the hose.

In constructing the non-expansible hose above referred to, the hose is expanded by forcing a fluid under pressure into the hose, and while it is in its expanded condition, a coil of wire is snugly inserted within the hose bore. Thus when the internal pressure is removed from the bore of the hose, the hose is held in its expanded position and will not readily expand thereafter when subjected to internal pressures, particularly if the internal pressures are less than that to which the hose was subjected when the coil of wire was inserted in the bore.

The present invention is designed to utilize the pressure of the fluid within the hose bore not only to expand the hose, but also to force the coil of wire into the bore of the hose.

It is believed that the invention will be best understood by a detailed description thereof taken in connection with the accompanying drawings, in which Fig. 1 is a side view of the device for inserting the coil within the hose, the fluid retaining tank only being shown in section;

Fig. 2 is an enlarged view of the central portion of the arrangement shown in Fig. 1, certain additional parts being shown in section better to disclose the construction of the apparatus;

Fig. 3 is a transverse section substantially on the line 3—3 of Fig. 2;

Fig. 4 is a section through the lower hose connection shown in Fig. 1;

Fig. 5 is a view of the guiding and supporting rails shown at the left in Fig. 4 and in the upper portion of Fig. 1;

Fig. 6 is a view of the end of the hose, partly in section, showing the fitting at the end thereof before the inner sleeve is expanded, Fig. 7 is a similar view showing the inner sleeve of the hose fitting in expanded condition, and Figure 8 is an enlarged view of a part of the apparatus illustrated in Figure 4.

As the hose structure disclosed in the present application is fully described in the patent above referred to, it will be described only briefly herein. It consists of the hose 10, which may be of any preferred construction, which is adapted to withstand high internal pressures. The fitting at the end of the hose consists of the outer sleeve 11 positioned about the end of the hose and provided with the threaded nipple 12. The inner surface of the sleeve 11 is serrated, as indicated at 15, in Figs. 6 and 7. Positioned within the nipple 12 is the sleeve or collar 13 provided with a reduced portion 14 extending into the bore of the hose. After the collar 13 has been placed in position, the reduced portion 14 is expanded as shown in Fig. 7, so that the inner diameter of the tube or sleeve is slightly greater than the normal diameter of the hose bore. In expanding the sleeve 14, portions of the outer surface of the hose are forced into the serrations 15, thus firmly securing the fitting to the hose end. As ordinarily employed, the hose is provided at each end with a fitting such as the one just described.

The means for inserting the coil of wire, indicated at 16 in Fig. 7, within the bore of the hose will now be described. Mounted within the tank 17, by means of the brackets 18 carried by the upright 19, is a vertically positioned tube or cylinder 21 closed at the bottom by means of the cap 22. Positioned within the tube 21 is a rod 24 about which may be positioned the spring 16. The lower end of the rod 24 is provided with an enlarged head 25 to prevent the rod from passing through the coil.

In screw threaded connection with the upper end of the tube 21 is a sleeve 26 (Fig. 2), the upper end of which is internally screw threaded, as indicated at 27, so as to receive the threaded nipple 12 at one end of the hose 10. Positioned about the sleeve 26 is the hub 28 of the hand wheel 29. The hub 28 is provided with a lining 30 which is adapted to engage the outer surface of the sleeve 26, and more particularly the shouldered portion 31 of the hose fitting (see Fig. 8). The portion 31 is flattened on one or more sides and the opening through the lining 30 is similarly flattened so that the shouldered portion 31 is non-rotatable in the lining 30.

The hub 28 is also provided with the external groove 32 arranged to be engaged by the inwardly directed end 33 of the spring member 34 which normally tends to prevent the hand wheel passing upwardly off from the upper end of the sleeve 26. Positioned between the shoulder 35 on the sleeve 26 and the hub 28 is a compression spring 36 which normally acts to urge the hub 28 and hand wheel 29 toward their uppermost positions.

In joining the hose fitting to the sleeve 26, the hose is inserted in position and rotated until the threaded portion 12 of the fitting has traveled within the upper end of the sleeve sufficiently to bring the shouldered portion 31 within the lining 30. The hose is now rotated through the medium of the lining 30 by means of the hand wheel 29. The spring 36 acts, during this operation, to maintain the hand wheel hub firmly in engagement with the hose fitting.

The rod 24 does not terminate at the upper end of the tube 21, but extends upwardly beyond the end of the tube a distance slightly greater than the length of the hose within which the coil is to be inserted. Thus in joining the hose fitting to the sleeve 26, the hose is first passed over the upwardly projecting end 37 of the rod 24.

Slidably mounted within the slot 20 formed in the web of the upright 19, adjacent to the upper end thereof, is a bracket member 38 which carries the threaded sleeve 39 (see Fig. 4), adapted to be joined to the nipple 12 of the fitting at the upper end of the hose 10. As previously stated, the bracket 38 is slidably mounted, and while the hose is being inserted over the rod 37 and joined to the sleeve 26, the bracket 38 and parts carried thereby are maintained in their uppermost positions by means of the spring 40 (see Fig. 5) carried by the upright member 19. When, however, the hose has been attached to the sleeve 26, as previously described, the bracket 38 is lowered, and the sleeve 39 is brought into engagement with the fitting at the upper end of the hose 10. In this process, the upper end 37 of the rod passes through the stuffing box 41 at the upper end of the sleeve 39.

Secured to the sleeve 39 is a hand wheel 42 by means of which the sleeve may be rotated to cause the threaded lower end thereof to firmly engage the threaded portion 12 of the hose fitting. During this process, rotation of the hose is prevented by reason of the flattened shoulder of the fitting being snugly engaged by the bracket member 38.

Carried by the bracket member 44 (Figs. 1 and 2) is a cylinder 45 which communicates through the tube 46 with a source of air under pressure, a valve 47 being provided to admit the air to the cylinder 45. The valve 47 is arranged to be operated by means of the lever 48 pivotally joined to one end of the link 49, the opposite end of the link 49 being pivotally connected to the lever 50, as shown in Fig. 1. The lever 50 is pivotally supported at 51 and is provided with a pedal 52 which is normally held in its elevated position by means of the tension spring 53. Thus, when it is desired to admit air into the cylinder 45, the operator may depress the pedal 52, causing the valve 47 to operate and air to be admitted to the cylinder 45.

Within the cylinder 45 is a piston 54 which is joined by the rod 55 to a piston 56 slidably positioned within the cylinder 57, also carried by the bracket member 44. Positioned about the rod 55 between the upper end of the cylinder 57 and the piston 54 is a compression spring 58 which acts normally to maintain the pistons in their uppermost positions. The lower end of the cylinder 57 communicates with the bore of the sleeve 26 through the medium of the tube 60 (Fig. 3).

Communicating with the lower end of the cylinder is a tube 62 which is joined to the strainer 63 through the check valve 64. The check valve 64 is arranged to admit fluid to the cylinder 57, but to prevent the escape of fluid from the cylinder.

We will assume that the tank 17 has a sufficient supply of fluid, preferably a combination of oil and alcohol, for the operation of the device, and that the cylinder 57, and tubes 21 and 60 are also filled with fluid. The rod 24 is then inserted in the tube 21, and the spring 16 dropped over the rod. The hose 10 is next inserted over the upper end 37 of the rod and attached to the sleeve 26 in a manner previously described. The bracket 38 is then lowered and sleeve 39 is attached to the upper end of the hose. The pedal 52 is now depressed, opening the valve 47 and admitting air under pressure to the cylinder 45. This causes the pistons 54 and 56 to move downwardly. Piston 56 operates to expel the fluid within the cylinder 57 through the tube 60 into the tube 21, and the bore of the hose 10. Due to the fact that the area of the piston 56 is only a fraction of the area of the piston 54, the fluid within the cylinder 57 may be placed under very high pressure. In practice, a pressure of substantially 1000 pounds is usually sufficient to satisfactorily expand the hose.

The end 25 of the rod 24 is acted upon by the fluid under pressure in a manner to tend to force the rod upwardly. Due to the fact that the upper end 37 of the rod passes through the stuffing box 41, it is not acted upon by the fluid so as to tend to force the rod downwardly. The rod 24 may have a diameter of perhaps $\frac{1}{4}''$. Thus the area of the rod would be approximately $\frac{1}{16}''$. If now the fluid within the system is under a pressure of 1000 pounds per square inch, the rod 24 will be acted upon by a pressure of approximately 60 pounds tending to force it upwardly. This pressure, it has been found, is sufficient to move the rod together with the coil 16 upwardly so as to position the coil within the bore of the hose. When the coil has moved upwardly to its uppermost position, the ends of the coil will be positioned within the sleeves 13 at the opposite ends of the hose (see Fig. 7).

The valve 47 is so constructed that in its normal position, it causes the cylinder 45 to communicate with the atmosphere, and in its actuated position joins the cylinder to a source of compressed air. Thus, when the pedal 52 is depressed, the rod 24 and coil 16 immediately move upwardly to position the coil within the hose bore. Upon permitting the pedal 52 to move upwardly, pressure is removed from the cylinder 45, and the pistons 54 and 56 are moved to their uppermost positions by means of the spring 58, thus removing pressure from the fluid within the cylinder. As the piston 56 moves upwardly, a new supply of fluid is drawn into the cylinder through the strainer 63 and tube 62. As soon as pressure is removed from the fluid within the cylinder, the rod 24 will drop or may be readily returned to its lowermost position. The fittings at the opposite ends of the hose may now readily be disconnected from the sleeves 26 and 39, respectively, through the medium of the hand wheels 29 and 42, and the hose removed in the reverse manner from which it was placed in position. It will thus be seen that due to the fact that the piston 54 greatly exceeds in size the piston 56, a fairly nominal pressure of compressed air will act to place the fluid in the cylinder 57 under a very high pressure. The pressure of the fluid within the system not only acts to expand the hose, but also acts to cause the coil 16 to be positioned within the bore of the hose.

While in the drawings and the above description applicant has limited his disclosure to a certain set of details, it is to be understood that various modifications are contemplated, and that the invention should be limited merely by the scope of the appended claims.

Having thus described my invention, what I claim as new and desire to secure by Letters Patent of the United States is:

1. In an apparatus of the class described, the combination of a tubular receptacle, a plunger rod loosely supported within said receptacle and extending therebeyond, a hose, means for securing one end thereof to said receptacle about the projecting end of said plunger rod, and a stuffing box secured to the opposite end of said hose and slidably receiving said plunger rod.

2. An apparatus for snugly inserting a flexible tube within a hose, comprising a tubular receptacle, a plunger rod slidably supported within the receptacle, said plunger rod being adapted to receive the flexible tube thereabout, means for securing one end of the hose to said receptacle and about said plunger, a stuffing box slidably receiving said plunger and adapted to be secured to the opposite end of the hose, and means for admitting fluid under pressure to said receptacle for expanding said hose and for forcing the plunger and the tube carried thereby into the hose.

3. An apparatus for snugly inserting a flexible tube within a hose to maintain it expanded, comprising a tubular receptacle, a plunger rod slidably supported within the receptacle, said plunger rod being adapted to receive the flexible tube thereabout, means for securing one end of the hose to said receptacle and about said plunger with the plunger extending through the opposite end of the hose, means for preventing fluid leakage between the opposite end of the hose and the plunger extending therebeyond, and means for admitting fluid under pressure to said receptacle for expanding said hose and for forcing the plunger and the tube carried thereby into the hose.

4. In an apparatus for snugly inserting a flexible non-collapsible tube within an expanded hose, comprising a plunger element adapted to extend within the bore of the hose and extend beyond the ends thereof, a receptacle for fluid-tight securement to one end of the hose and for receiving the corresponding end of the plunger, the plunger element being adapted to receive the tube thereabout but within the receptacle, means for preventing fluid leakage between the opposite end of the hose and the corresponding end of the plunger protruding therebeyond, and means for admitting fluid under pressure to the receptacle and associated hose for expanding the hose and for exerting a pressure on the plunger element effective to force it longitudinally through the hose to insert the tube therein.

In witness whereof, I hereunto subscribe my name this 7 day of December, 1923.

MORTON ROLAND SHERBINO.